US009336645B2

(12) United States Patent
Bristol et al.

(10) Patent No.: US 9,336,645 B2
(45) Date of Patent: May 10, 2016

(54) GAMING SYSTEM AND METHOD FOR PLAYING A GAME INCLUDING A PLURALITY OF LINKED SYMBOL GENERATORS

(71) Applicant: IGT, Las Vegas, NV (US)

(72) Inventors: Rachael A. Bristol, San Francisco, CA (US); Ana K. Rollins, Burlingame, CA (US); Alexander C. Present, Berkeley, CA (US); Andrew G. Peet, San Francisco, CA (US); Prashant Arora, Mountain View, CA (US); Melinda C. Pitpit, San Francisco, CA (US); Jon M. Leupp, Orinda, CA (US); Bryan D. Wolf, Reno, NV (US)

(73) Assignee: IGT, Las Vegas, NV (US)

( * ) Notice: Subject to any disclaimer, the term of this patent is extended or adjusted under 35 U.S.C. 154(b) by 296 days.

(21) Appl. No.: 14/030,373

(22) Filed: Sep. 18, 2013

(65) Prior Publication Data

US 2015/0080101 A1 Mar. 19, 2015

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.

CPC .......... *G07F 17/3213* (2013.01); *G07F 17/326* (2013.01); *G07F 17/34* (2013.01)

(58) Field of Classification Search

CPC G07F 17/3265; G07F 17/3258; G07F 17/326
USPC .................................... 463/16–18, 20, 30–33
See application file for complete search history.

(56) References Cited

U.S. PATENT DOCUMENTS

| | | | |
|---|---|---|---|
| 2,077,124 | A | 4/1937 | Miller et al. |
| 2,545,644 | A | 3/1951 | Benton et al. |

(Continued)

FOREIGN PATENT DOCUMENTS

| | | |
|---|---|---|
| AU | 199716432 | 10/1999 |
| DE | 8710757 | 11/1987 |

(Continued)

OTHER PUBLICATIONS

Slot Machines a Pictorial History of the First 100 Years 5th edition written by Marshall Fey published 1983 to 1997.

*Primary Examiner* — Ronald Laneau
*Assistant Examiner* — Ross Williams
(74) *Attorney, Agent, or Firm* — Neal, Gerber & Eisenberg LLP

(57) ABSTRACT

A gaming system including a game which utilizes a plurality of symbol generators. Each of the symbol generators is linked to at least another one of the symbol generators, such that the plurality of symbol generators are linked with each other to form a group of coupled symbol generators. In operation, for a play of a game, the gaming system activates (i.e., spins) one of the symbol generators. Due to the symbol generators being directly or indirectly coupled with one another, this activation of one of the symbol generators causes an activation of each of the linked symbol generators. Following the activation of the symbol generators, one of the symbol generators is deactivated (i.e., stopped) at a randomly selected orientation which causes each of the symbol generators to also be deactivated. The gaming system then evaluates any indicated symbols associated with the stopped symbol generators and provides one or more awards based on the evaluated symbol generators.

23 Claims, 10 Drawing Sheets

(56) References Cited

U.S. PATENT DOCUMENTS 3,633,915 A 1/1972 Lippert
3,975,022 A 8/1976 Figueroa
4,346,900 A 8/1982 Lamlee
4,410,178 A 10/1983 Partridge
4,448,419 A 5/1984 Telnaes
4,492,378 A 1/1985 Williams
4,560,161 A 12/1985 Hamano
4,624,459 A 11/1986 Kaufman
4,695,053 A 9/1987 Vazquez, Jr. et al.
4,732,386 A 3/1988 Rayfiel
4,756,531 A 7/1988 DiRe
4,775,155 A 10/1988 Lees
4,941,665 A 7/1990 Klamer
5,058,893 A 10/1991 Bertram et al.
5,152,529 A 10/1992 Okada
5,184,821 A 2/1993 Korenek
5,190,495 A 3/1993 Taxon
5,205,555 A 4/1993 Hamano
5,259,616 A 11/1993 Bergmann
5,324,041 A 6/1994 Boylan et al.
5,342,047 A 8/1994 Heidel et al.
5,344,144 A 9/1994 Canon
5,344,145 A 9/1994 Chadwick et al.
5,362,052 A 11/1994 Kubatsch
5,364,100 A 11/1994 Ludlow et al.
5,395,111 A 3/1995 Inoue
5,407,200 A 4/1995 Zalabak
5,423,539 A 6/1995 Nagao
5,449,173 A 9/1995 Thomas et al.
5,490,670 A 2/1996 Hobert
5,501,455 A 3/1996 Hirata et al.
5,536,016 A 7/1996 Thompson
5,542,669 A 8/1996 Charron et al.
5,553,851 A 9/1996 Malavazos et al.
5,560,603 A 10/1996 Seelig et al.
5,584,763 A 12/1996 Kelly et al.
5,584,764 A 12/1996 Inoue
5,609,337 A 3/1997 Clapper, Jr.
5,609,524 A 3/1997 Inoue
5,611,535 A 3/1997 Tiberio
5,622,366 A 4/1997 Inoue
5,664,998 A 9/1997 Seelig et al.
5,722,891 A 3/1998 Inoue
5,743,526 A 4/1998 Inoue
5,752,881 A 5/1998 Inoue
5,769,716 A 6/1998 Saffari et al.
5,772,509 A 6/1998 Weiss
5,788,573 A 8/1998 Baerlocher et al.
5,823,872 A 10/1998 Prather et al.
5,823,874 A 10/1998 Adams et al.
D400,597 S 11/1998 Hedrick et al.
D402,702 S 12/1998 Seelig et al.
5,848,932 A 12/1998 Adams
5,851,148 A 12/1998 Brune et al.
5,863,249 A 1/1999 Inoue
5,873,781 A 2/1999 Keane
D406,865 S 3/1999 Heidel
5,882,261 A 3/1999 Adams
5,885,157 A 3/1999 Harada et al.
5,911,418 A 6/1999 Adams et al.
5,919,088 A 7/1999 Weiss
5,919,091 A 7/1999 Bell et al.
5,927,714 A 7/1999 Kaplan
5,934,999 A 8/1999 Valdez
5,935,002 A 8/1999 Falciglia
5,947,820 A 9/1999 Morro et al.
5,951,397 A 9/1999 Dickinson
5,964,463 A 10/1999 Moore, Jr.
5,976,015 A 11/1999 Seelig et al.
5,980,384 A 11/1999 Barrie
5,984,782 A 11/1999 Inoue
5,988,643 A 11/1999 Awada
5,989,121 A 11/1999 Sakamoto
5,997,401 A 12/1999 Crawford
6,004,207 A 12/1999 Wilson, Jr. et al.
6,015,346 A 1/2000 Bennett
6,033,307 A 3/2000 Vancura
6,056,642 A 5/2000 Bennett
6,059,289 A 5/2000 Vancura
6,059,658 A 5/2000 Mangano et al.
6,062,979 A 5/2000 Inoue
6,062,980 A 5/2000 Luciano
6,086,066 A 7/2000 Takeuchi et al.
6,089,976 A 7/2000 Schneider et al.
6,089,977 A 7/2000 Bennett
6,089,978 A 7/2000 Adams
6,093,102 A 7/2000 Bennett
6,102,798 A 8/2000 Bennett
6,105,962 A 8/2000 Malavazos et al.
6,113,098 A 9/2000 Adams
6,120,031 A 9/2000 Adams
6,120,377 A 9/2000 McGinnis, Sr. et al.
6,126,542 A 10/2000 Fier
6,129,355 A 10/2000 Hahn et al.
6,135,884 A 10/2000 Hedrick et al.
6,142,873 A 11/2000 Weiss et al.
6,142,874 A 11/2000 Kodachi et al.
6,146,273 A 11/2000 Olsen
6,159,095 A 12/2000 Frohm et al.
6,159,097 A 12/2000 Gura
6,159,098 A 12/2000 Slomiany et al.
6,162,121 A 12/2000 Morro et al.
6,164,652 A 12/2000 Lauretta et al.
6,168,520 B1 1/2001 Baerlocher et al.
6,168,523 B1 1/2001 Piechowiak et al.
6,173,955 B1 1/2001 Perrie et al.
6,174,235 B1 1/2001 Walker et al.
6,186,894 B1 2/2001 Mayeroff
6,190,254 B1 2/2001 Bennett
6,190,255 B1 2/2001 Thomas et al.
6,200,217 B1 3/2001 Osawa
6,203,429 B1 3/2001 Demar et al.
D441,031 S 4/2001 Seelig et al.
6,213,876 B1 4/2001 Moore, Jr.
6,217,022 B1 4/2001 Astaneha
6,220,593 B1 4/2001 Pierce et al.
6,224,483 B1 5/2001 Mayeroff
6,227,969 B1 5/2001 Yoseloff
6,227,970 B1 5/2001 Shimizu et al.
6,227,971 B1 5/2001 Weiss
6,227,972 B1 5/2001 Walker et al.
6,231,442 B1 5/2001 Mayeroff
6,234,897 B1 5/2001 Frohm et al.
D443,313 S 6/2001 Brettschneider
6,251,013 B1 6/2001 Bennett
6,254,481 B1 7/2001 Jaffe
6,261,177 B1 7/2001 Bennett
6,267,669 B1 7/2001 Luciano, Jr. et al.
6,270,411 B1 8/2001 Gura et al.
6,283,855 B1 9/2001 Bingham
6,299,165 B1 10/2001 Nagano
6,302,790 B1 10/2001 Brossard
6,305,686 B1 10/2001 Perrie et al.
6,309,300 B1 10/2001 Glavich
6,312,334 B1 11/2001 Yoseloff
6,315,663 B1 11/2001 Sakamoto
6,315,664 B1 11/2001 Baerlocher et al.
6,319,123 B1 11/2001 Paludi
6,328,649 B1 12/2001 Randall et al.
6,334,814 B1 1/2002 Adams
6,336,860 B1 1/2002 Webb
6,336,863 B1 1/2002 Baerlocher et al.
6,338,678 B1 1/2002 Seelig et al.
6,340,158 B2 1/2002 Pierce et al.
6,346,043 B1 2/2002 Colin et al.
6,347,795 B1 2/2002 DeLeljer
6,347,996 B1 2/2002 Gilmore et al.
6,364,766 B1 4/2002 Anderson et al.
6,364,767 B1 4/2002 Brossard et al.
6,368,216 B1 4/2002 Hedrick et al.
6,375,187 B1 4/2002 Baerlocher
6,386,974 B1 5/2002 Adams
6,398,218 B1 6/2002 Vancura
6,398,220 B1 6/2002 Inoue

(56) References Cited

U.S. PATENT DOCUMENTS 6,398,644 B1 6/2002 Perrie et al.
6,398,651 B1 6/2002 Yamada
6,406,369 B1 6/2002 Baerlocher et al.
6,413,160 B1 7/2002 Vancura
6,419,579 B1 7/2002 Bennett et al.
6,428,412 B1 8/2002 Anderson et al.
6,439,995 B1 8/2002 Hughs Baird et al.
6,443,837 B1 9/2002 Jaffe et al.
6,450,884 B1 9/2002 Seelig et al.
6,454,651 B1 9/2002 Yoseloff
6,461,241 B1 10/2002 Webb et al.
6,464,582 B1 10/2002 Baerlocher et al.
D465,531 S 11/2002 Luciano, Jr. et al.
6,481,713 B2 11/2002 Perrie et al.
6,482,089 B2 11/2002 Demar et al.
6,491,584 B2 12/2002 Graham et al.
6,494,454 B2 12/2002 Adams
6,506,117 B2 1/2003 DeMar et al.
6,508,707 B2 1/2003 DeMar et al.
6,533,660 B2 3/2003 Seelig et al.
6,536,766 B1 3/2003 Deitch et al.
6,537,152 B2 3/2003 Seelig et al.
6,561,512 B2 5/2003 Luciano
6,561,904 B2 5/2003 Locke et al.
6,569,015 B1 5/2003 Baerlocher et al.
6,582,306 B1 6/2003 Kaminkow
6,582,307 B2 6/2003 Webb
6,599,185 B1 7/2003 Kaminkow et al.
6,602,135 B1 8/2003 Gerrard
6,602,137 B2 8/2003 Kaminkow et al.
6,605,000 B2 8/2003 Adams
6,607,437 B2 8/2003 Casey et al.
6,609,972 B2 8/2003 Seelig et al.
6,644,664 B2 11/2003 Muir et al.
6,659,863 B2 12/2003 Ashley et al.
6,663,489 B2 12/2003 Baerlocher
6,692,355 B2 2/2004 Baerlocher et al.
6,705,944 B2 3/2004 Luciano
6,712,694 B1 3/2004 Nordman
6,715,756 B2 4/2004 Inoue
6,729,955 B2 5/2004 Bennett et al.
6,749,502 B2 6/2004 Baerlocher
6,769,987 B1 8/2004 Morita et al.
6,786,819 B2 9/2004 Baerlocher et al.
6,793,577 B1 9/2004 Wilkins et al.
6,827,646 B2 12/2004 Adams
6,835,132 B2 12/2004 Bennett
6,855,052 B2 2/2005 Weiss et al.
6,855,056 B2 2/2005 Inoue
D503,951 S 4/2005 Karstens
6,890,255 B2 5/2005 Jarvis et al.
6,899,620 B2 5/2005 Kaminkow et al.
6,905,405 B2 6/2005 McClintic
6,905,407 B2 6/2005 Nordman
D512,464 S 12/2005 Karstens
D512,465 S 12/2005 Karstens
6,974,129 B2 12/2005 Nordman
6,988,731 B2 1/2006 Inoue
7,004,835 B2 2/2006 Baerlocher
7,040,983 B2 5/2006 Dolloff et al.
7,056,209 B2 6/2006 Baerlocher et al.
7,059,967 B2 6/2006 Baerlocher
7,121,943 B2 10/2006 Webb et al.
7,128,646 B2 10/2006 Baerlocher et al.
7,160,188 B2 1/2007 Kaminkow et al.
7,179,169 B2 2/2007 Beaulieu et al.
7,204,754 B2 4/2007 Gray et al.
7,226,358 B2 6/2007 Miller et al.
7,235,011 B2 6/2007 Randall et al.
7,294,055 B2 11/2007 Baerlocher et al.
7,341,512 B2 3/2008 Dolloff et al.
7,361,088 B2 4/2008 Maya
7,399,226 B2 7/2008 Mishra
7,425,177 B2 9/2008 Rodgers et al.
7,427,236 B2 9/2008 Kaminkow et al.
7,442,123 B2 10/2008 Brill et al.
7,455,585 B2 11/2008 Englman
7,575,514 B2 8/2009 Cuddy et al.
7,591,723 B2 9/2009 Cregan et al.
7,614,947 B2 11/2009 Baerlocher et al.
7,614,952 B2 11/2009 Elias
7,625,278 B2 12/2009 Paulsen et al.
7,674,172 B2 3/2010 Miltenberger et al.
7,690,978 B2 4/2010 Webb et al.
7,708,628 B2 5/2010 Baerlocher
7,708,630 B2 5/2010 Nicely
7,731,584 B2 6/2010 Glavich et al.
7,740,535 B2 6/2010 Kido
7,771,268 B2 8/2010 Mayeroff
7,780,520 B2 8/2010 Baerlocher
7,792,920 B2 9/2010 Istvan et al.
7,794,317 B2 9/2010 Kaminkow et al.
7,806,760 B2 10/2010 Baerlocher
7,850,171 B2 12/2010 Bontempo et al.
8,100,754 B2 1/2012 Bigelow, Jr. et al.
8,210,944 B2 7/2012 Mead
8,246,445 B2 8/2012 Rodgers et al.
8,262,458 B2 9/2012 Rodgers et al.
8,308,547 B2 11/2012 Walker et al.
8,342,941 B2 1/2013 Nicely
8,460,084 B2 6/2013 Kaminkow et al.
2001/0024971 A1 9/2001 Brossard
2001/0049298 A1 12/2001 Bennett
2002/0004424 A1 1/2002 Nelson et al.
2002/0025846 A1 2/2002 Bennett et al.
2002/0025849 A1 2/2002 Olive
2002/0042294 A1 4/2002 Pau et al.
2002/0094862 A1 7/2002 Inoue
2002/0137559 A1 9/2002 Baerlocher
2002/0142829 A1 10/2002 Inoue
2003/0027628 A1 2/2003 Luciano
2003/0036420 A1 2/2003 Baerlocher et al.
2003/0040355 A1 2/2003 Baerlocher
2003/0040358 A1 2/2003 Rothkranz et al.
2003/0045338 A1 3/2003 Dolloff et al.
2003/0064773 A1 4/2003 Baerlocher et al.
2003/0064790 A1 4/2003 Hughs-Baird et al.
2003/0078089 A1 4/2003 Gray et al.
2003/0178768 A1 9/2003 Luciano et al.
2003/0181239 A1 9/2003 Walker et al.
2003/0195027 A1 10/2003 Baerlocher et al.
2003/0199311 A1 10/2003 Webb
2003/0222401 A1 12/2003 Kaminkow
2003/0232643 A1 12/2003 Inoue
2004/0000754 A1 1/2004 Inoue
2004/0002372 A1 1/2004 Rodgers et al.
2004/0002373 A1 1/2004 Kaminkow
2004/0009807 A1 1/2004 Miller et al.
2004/0012145 A1 1/2004 Inoue
2004/0014516 A1 1/2004 Inoue
2004/0014517 A1 1/2004 Inoue
2004/0017041 A1 1/2004 Inoue
2004/0018866 A1 1/2004 Inoue
2004/0026854 A1 2/2004 Inoue
2004/0036218 A1 2/2004 Inoue
2004/0038726 A1 2/2004 Inoue
2004/0038734 A1 2/2004 Adams
2004/0041340 A1 3/2004 Inoue
2004/0048645 A1 3/2004 Webb et al.
2004/0048649 A1 3/2004 Peterson et al.
2004/0048673 A1 3/2004 Kaminkow
2004/0053658 A1 3/2004 Rothranz
2004/0053659 A1 3/2004 Rothkranz et al.
2004/0053660 A1 3/2004 Webb et al.
2004/0053663 A1 3/2004 Paulsen et al.
2004/0053665 A1 3/2004 Baerlocher
2004/0053670 A1 3/2004 Rothkranz et al.
2004/0053671 A1 3/2004 Nordman
2004/0053687 A1 3/2004 Nordman et al.
2004/0077403 A1 4/2004 Maya et al.
2004/0082378 A1 4/2004 Peterson et al.
2004/0121838 A1 6/2004 Hughs-Baird et al.
2004/0121840 A1 6/2004 Rosander et al.
2004/0147306 A1 7/2004 Randall et al.

(56) References Cited

U.S. PATENT DOCUMENTS

| | | | |
|---|---|---|---|
| 2004/0150161 | A1 | 8/2004 | Inoue |
| 2004/0152498 | A1 | 8/2004 | Kaminkow et al. |
| 2004/0155399 | A1 | 8/2004 | Inoue |
| 2004/0157658 | A1 | 8/2004 | Rothkranz |
| 2004/0171417 | A1 | 9/2004 | Beaulieu et al. |
| 2004/0171419 | A1 | 9/2004 | Walker et al. |
| 2004/0171423 | A1 | 9/2004 | Silva et al. |
| 2004/0180715 | A1 | 9/2004 | Nordman |
| 2004/0183251 | A1 | 9/2004 | Inoue |
| 2005/0014562 | A1 | 1/2005 | Fujimoto |
| 2005/0054412 | A1 | 3/2005 | Gauselmann |
| 2005/0059455 | A1 | 3/2005 | Gerrard et al. |
| 2006/0025200 | A1 | 2/2006 | Van Asdale |
| 2006/0073867 | A1 | 4/2006 | Rothkranz |
| 2006/0080408 | A1 | 4/2006 | Istvan et al. |
| 2006/0189364 | A1 | 8/2006 | Baerlocher |
| 2006/0237905 | A1 | 10/2006 | Nicely |
| 2007/0129131 | A1 | 6/2007 | Kaminkow et al. |
| 2007/0178972 | A1 | 8/2007 | Moshal |
| 2008/0081688 | A1 * | 4/2008 | Plowman ................ G07F 17/34 463/20 |
| 2013/0029746 | A1 * | 1/2013 | Watkins ............. G07F 17/3267 463/20 |
| 2013/0059638 | A1 | 3/2013 | Nicely |
| 2013/0059647 | A1 | 3/2013 | Nicely |

FOREIGN PATENT DOCUMENTS

| | | |
|---|---|---|
| EP | 0797175 | 9/1997 |
| GB | 2100905 | 6/1981 |
| GB | 2106293 | 9/1981 |
| GB | 2090690 | 7/1982 |
| GB | 2096376 | 10/1982 |
| GB | 2137392 | 10/1984 |
| GB | 2144644 | 3/1985 |
| GB | 2153572 | 8/1985 |
| GB | 2170636 | 8/1986 |
| GB | 2180682 | 4/1987 |
| GB | 2181589 | 4/1987 |
| GB | 2183882 | 6/1987 |
| GB | 2191030 | 12/1987 |
| GB | 2201821 | 9/1988 |
| GB | 2222712 | 3/1990 |
| GB | 2225889 | 6/1990 |
| GB | 2242300 | 9/1991 |
| GB | 2322217 | 8/1998 |
| JP | 200353002 | 2/2003 |
| JP | 200473593 | 3/2004 |
| WO | WO/03/011409 | 2/2003 |

* cited by examiner 1116,1118

1116,1118

GAMING SYSTEM AND METHOD FOR PLAYING A GAME INCLUDING A PLURALITY OF LINKED SYMBOL GENERATORS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award).

In one known slot gaming machine, the gaming machine includes a plurality of reels and one or more paylines. Such gaming machines include any suitable number of reels, such as three to five reels, which each display any suitable number of symbols per reel, such as three symbols per reel, wherein each reel includes one symbol displayed in each of a plurality of symbol positions on that reel. Such gaming machines may have one, three, five, nine, fifteen, twenty-five or any other suitable number of paylines which are horizontal, vertical, diagonal or any combination thereof.

In certain known slot gaming machines, upon placing one or more wagers, the reels spin independent of each other (i.e., the spinning of one reel does not appear to cause the spinning of any other reels). In these known slot gaming machines, the reels stop to generate a plurality of symbols and the gaming machine analyzes the generated symbols to determine if the gaming machine has randomly generated a winning symbol or winning symbol combination on or along one or more of the wagered on paylines. Any awards associated with any generated winning symbols or winning symbol combinations generated along any wagered on paylines are provided to the player. Alternatively, any awards associated with any winning symbols or winning symbol combinations that are generated anywhere on a wagered on payline (i.e., a line scatter pay) or anywhere on the reels (i.e., a reel scatter pay) are provided to the player.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

One known type of bonus game employs a wheel including several awards. In one such bonus game, a multi-colored award wheel is attached to the cabinet of the gaming machine. The award wheel is divided into several sections. Each section includes an award that ranges in value, such as from twenty-five to one-thousand. In this gaming machine, a player plays a base game that includes spinning reels and one or more paylines. When a wheel symbol is positioned along a designated payline on the third reel, the player enters the bonus game. In the bonus game, the player obtains one opportunity or spin of the award wheel. The player spins the award wheel by pressing a button on the gaming device. Once the award wheel starts spinning, the player waits until it stops. An indicator located at the top of the award wheel points to a section of the wheel. The player receives the award on the indicated section for the bonus game. After the player receives that award, the bonus game ends and the player may resume playing the base game.

There is a continuing need to increase the level of excitement and entertainment for people playing gaming machines.

SUMMARY

The present disclosure relates generally to gaming systems and methods for playing a game including a plurality of linked symbol generators.

In various embodiments, the gaming system disclosed herein includes a game which utilizes a plurality of symbol generators. Each of the symbol generators is linked to at least another one of the symbol generators, such that the plurality of symbol generators are interlocked or otherwise linked with each other to form a group or set of interlocked or linked symbol generators. In operation of these embodiments, for a play of a game, the gaming system activates (i.e., spins) one of the symbol generators. Due to the symbol generators being directly or indirectly linked with one another, this activation of one of the symbol generators causes an activation of each of the other linked symbol generators. Following the activation of the symbol generators, one of the symbol generators is deactivated (i.e., stopped) at a randomly selected orientation which causes each of the other symbol generators to also be deactivated. The gaming system then evaluates any indicated symbols associated with the stopped symbol generators and provides one or more awards based on the evaluated symbol generators. Such a configuration provides an increased amount of anticipation (and thus an increased amount of excitement) for certain players as these players enjoy watching a symbol combination formed by a plurality of interlocking symbol generators.

More specifically, in certain embodiments, the gaming system includes a game employing a plurality of symbol generators. Each symbol generator includes a plurality of sections or symbol display positions. Each section of each symbol generator displays one of a plurality of different symbols. Each symbol generator is interlocked or directly coupled with at least another one of the symbol generators, wherein each pairing of directly coupled symbol generators are associated with or otherwise define an evaluation point or area (e.g., the point or area where two symbol generators intersect and, as described below, movement from one symbol generator is conveyed to the other symbol generator). Zero, one or more of the symbol generators are also indirectly coupled with one or more symbol generators such that each of the plurality of symbol generators are linked with one another (via either a direct or indirect coupling) to define or form a group or set of linked symbol generators. In In operation of these embodiments, for a play of a game, the gaming system activates or spins one of the symbol generators. This activation of one symbol generator results in the activation or spinning of each of the symbol generators such that the gaming system at least partially concurrently spins each of the symbol generators. That is, similar to how motion is conveyed from one interlocked gear to another interlocked gear, the gaming system conveys the spinning of one symbol generator to another symbol generator (to result in the simultaneous or overlapping spinning of both symbol generators). For example, for a game employing three symbol generators wherein the first symbol generator is interlocked to the second symbol generator which is interlocked to the third symbol generator, the activation of the first symbol generator causes the activation or spinning of the second symbol generator (i.e., the symbol generator directly coupled with the first symbol generator). In this example, the activation of the second symbol generator causes the activation or spinning of the third symbol generator (i.e., the symbol generator directly coupled with the second symbol generator and indirectly coupled with the first symbol generator) such that the spinning of one symbol generator of the formed group of symbol generators causes the gaming system to simultaneously or overlappingly spin each of the symbol generators of the formed group or set of symbol generators.

Following the activation of one of the symbol generators (and the resulting activation of each of the linked symbol generators), the gaming system randomly deactivates or stops one of the symbol generators. This deactivation of one symbol generator results in the deactivation or stopping of each of the symbol generators. That is, the gaming system conveys, either directly or indirectly, the stopping of one symbol generator to each of the symbol generators of the formed group of symbol generators (to result in the stopping of each of the symbol generators of the formed group of symbol generators). Continuing with the above example, the deactivation or stopping of the first symbol generator causes the deactivation or stopping of the second symbol generator (i.e., the symbol generator directly coupled with the first symbol generator) which causes the deactivation or stopping of the third symbol generator (i.e., the symbol generator directly coupled with the second symbol generator and indirectly coupled with the first symbol generator).

Following the deactivation or stopping of one of the symbol generators (and the resulting deactivation or stopping of each of the linked symbol generators of the formed group of symbol generators), the gaming system determines whether the symbols currently displayed at or adjacent to the evaluation points of the different symbol generators, such as the intersection points of the different symbol generators, form any winning symbol combinations. That is, for each pair of interlocking symbol generators, the gaming system determines whether the symbols of the sections of the symbol generators currently positioned at or adjacent to the evaluation point or area of the two interlocking symbol generators form part or all of a winning symbol combination (i.e., the evaluation points or area form one or more paylines which the gaming system evaluates for any winning symbol combinations).

If the symbols currently displayed at or adjacent to the evaluation points of the different symbol generators do not form any winning symbol combinations, the gaming system concludes or terminates the play of the game. On the other hand, if the symbols currently displayed at or adjacent to the evaluation points of the different symbol generators form any winning symbol combinations, the gaming system provides one or more benefits to the player. In one such embodiment, the benefit associated with such a formed winning symbol combination includes the gaming system providing any awards associated with the formed winning symbol combination. In another such embodiment, the benefit associated with such a formed winning symbol combination includes the gaming system triggering a play of a secondary game associated with the formed winning symbol combination. In another such embodiment, the benefit associated with such a formed winning symbol combination includes the gaming system activating any modifiers associated with the formed winning symbol combination.

Such a configuration of employing a plurality of linked symbol generators wherein the activation of one symbol generator directly or indirectly activates each of the linked symbol generators provides an increased level of excitement for certain players by dynamically displaying the formation of different symbol combinations associated with different awards. Moreover, such a configuration of varying the quantity of symbol generators employed, varying the size of one or more symbol generators employed (i.e., how many sections of one or more symbol generators) and/or varying the configuration of such symbol generators (i.e., which symbol generators are adjacent to which symbol generators) varies the symbol combinations available to be generated from game play to game play and thus increases the volatility of the game and the level of enjoyment for certain players.

Additional features and advantages are described herein, and will be apparent from the following Detailed Description and the figures.

DETAILED DESCRIPTION

Interlocked Symbol Generators

In various embodiments, the gaming system disclosed herein includes a game which utilizes a plurality of symbol generators. Each of the symbol generators is linked to at least another one of the symbol generators, such that the plurality of symbol generators are interlocked or otherwise linked with each other to form a group or set of interlocked or linked symbol generators. In operation of these embodiments, for a play of a game, the gaming system activates (i.e., spins) one of the symbol generators. Due to the symbol generators being directly or indirectly linked with one another, this activation of one of the symbol generators causes an activation of each of the other linked symbol generators. Following the activation of the symbol generators, one of the symbol generators is deactivated (i.e., stopped) at a randomly selected orientation which causes each of the other linked symbol generators to also be deactivated. The gaming system then evaluates any indicated symbols associated with the stopped symbol generators and provides one or more awards based on the evaluated symbol generators. Such a configuration provides an increased amount of anticipation (and thus an increased amount of excitement) for certain players as these players enjoy watching one symbol generator drive the outcome of a plurality of symbol generators.

While certain of the embodiments described below are directed to employing a plurality of linked symbol generators in association with a primary or base game, it should be appreciated that the present disclosure may additionally or alternatively be employed in association with utilizing a plurality of linked symbol generators in association with a secondary or bonus game. Moreover, while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

Figure 1:
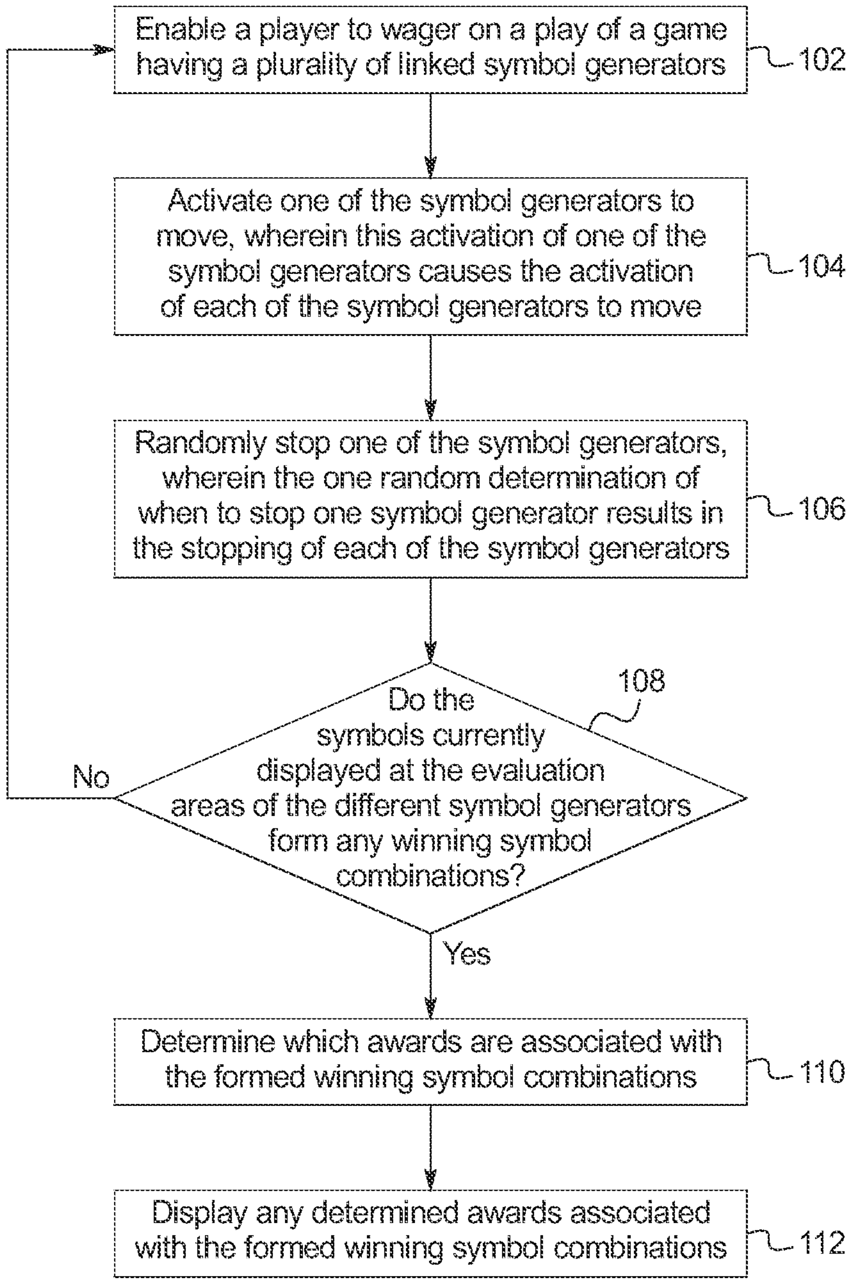
FIG. 1 is a flow chart of an example process for operating a gaming system including a plurality of interlocking symbol generators as disclosed herein.

Referring now to FIG. 1, a flowchart of an example embodiment of a process for operating a gaming system disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In various embodiments, as indicated in block 102, the gaming system enables a player to wager on a play of a game having a plurality of linked symbol generators.

Each of the symbol generators is interlocked with or otherwise linked to at least another one of the symbol generators, such that the plurality of symbol generators are interlocked or otherwise linked with each other to form a group or set of interlocked symbol generators. That is, each symbol generator is either directly or indirectly coupled with each of the other symbol generators in the formed group of symbol generators, such that each symbol generator is: (i) directly coupled with one or more of the other symbol generators in the formed group of symbol generators, and (ii) indirectly coupled with any remaining symbol generators in the formed group of symbol generators which that symbol generator is not directly coupled with. In these embodiments, a plurality of symbol generators are linked when the movement of one symbol generator causes the movement of another symbol generator.

Figure 2A:
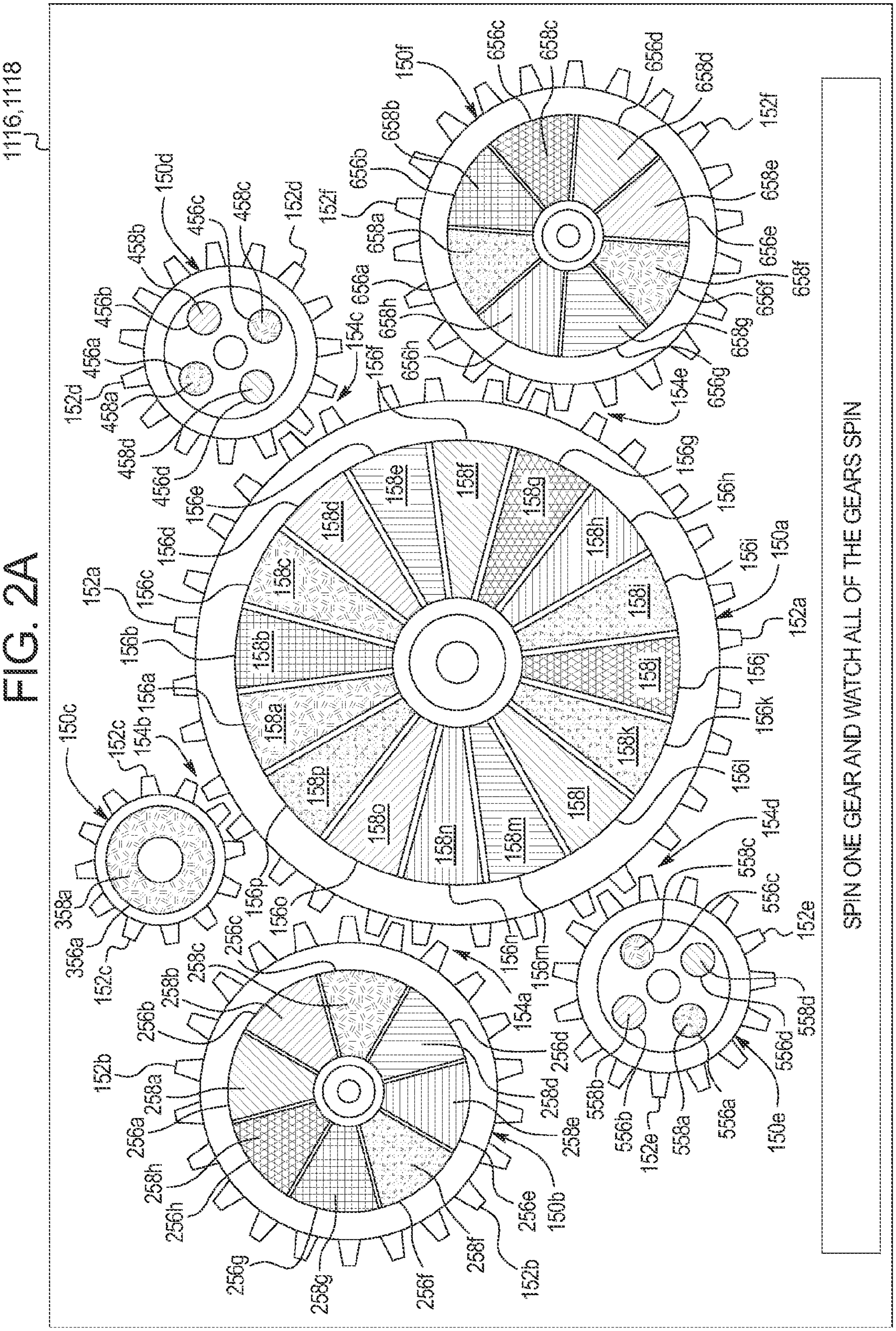
FIGS. 2A, 2B and 2C are front views of one embodiment of the gaming system disclosed herein illustrating the activation of one symbol generator causing the activation of each of the linked symbol generators to determine a symbol combination.

For example, as seen in FIG. 2A, for the wagered on play of the game, the gaming system displays six symbol generators 150 displayed as six interlocking gears each including a plurality of teeth 152. In this example, the gaming system displays each symbol generator 150 directly or indirectly coupled with or otherwise linked to each of the other symbol generators. Specifically, the gaming system displays a first symbol generator 150*a* (having a first plurality of teeth 152*a*) directly interlocked or otherwise linked to: (i) a second symbol generator 150*b* (having a second plurality of teeth 152*b*) at a first intersection point or area 154*a*; (ii) a third symbol generator 150*c* (having a third plurality of teeth 152*c*) at a second intersection point or area 154*b*; (iii) a fourth symbol generator 150*d* (having a fourth plurality of teeth 152*d*) at a third intersection point or area 154*c*; (iv) a fifth symbol generator 150*e* (having a fifth plurality of teeth 152*e*) at a fourth intersection point or area 154*d*; and (v) a sixth symbol generator 150*f* (having a sixth plurality of teeth 152*f*) at a fifth intersection point or area 154*e*. In this example, while the second symbol generator 150*b*, the third symbol generator 150*c*, the fourth symbol generator 150*d*, the fifth symbol generator 150*e* and the sixth symbol generator 150*f* are not directly coupled with each other, each of these symbol generators are indirectly coupled with each other via symbol generator 150*a*.

In one embodiment, one or more symbol generators are directly coupled with one other symbol generator and indirectly coupled with zero, one or more other symbol generators. In one embodiment, one or more symbol generators are directly coupled with a plurality of other symbol generators and indirectly coupled with zero, one or more other symbol generators. For example, as seen in FIG. 2A, at least one symbol generator 150*a* is directly coupled with a plurality of other symbol generators and at least one symbol generators 150*b* to 150*f* are each directly coupled with another one of the symbol generators.

It should be appreciated that while FIG. 2A displays one arrangement of symbol generators, any suitable arrangement of symbol generators (wherein each symbol generator is directly coupled with at least another one of the symbol generators of the formed group of symbol generators and indirectly coupled with the remaining symbol generators of the formed group of symbol generators) may be employed in association with the present disclosure. That is, while each symbol generator is linked to at least another one of the symbol generators (and share an intersection point or area with that other symbol generator), zero, one or more symbol generators may each be linked to a plurality of symbol generators (and thus share a plurality of respective intersection points or areas with the other symbol generators).

In addition to each symbol generator being directly coupled with at least another one of the symbol generators (and indirectly coupled with any remaining symbol generators in the group of symbol generators), each symbol generator includes one or more sections or symbol display positions. Each section of each symbol generator displays one of a plurality of different symbols. For example, as seen in FIG. 2A, each symbol generator includes one or more sections, wherein each section displays one of a plurality of different symbols, displayed as one of a plurality of different colors. Specifically, the gaming system displays: (i) the first symbol generator 150*a* including sixteen sections 156*a* to 156*p* which display sixteen symbols 158*a* to 158*p* (displayed as seven different colors); (ii) the second symbol generator 150*b* including eight sections 256*a* to 256*h* which display eight symbols 258*a* to 258*h* (displayed as five different colors); (iii) the third symbol generator 150*c* including one section 356*a* which displays one symbol 358*a* (displayed as one color); (iv) the fourth symbol generator 150*d* including four sections 456*a* to 456*d* which display four symbols 458*a* to 458*d* (displayed as four different colors); (v) the fifth symbol generator 150*e* including four sections 556*a* to 556*d* which display four symbols 558*a* to 558*d* (displayed as four different colors); and (vi) the sixth symbol generator 150*f* including eight sections 656*a* to 656*h* which display eight symbols 658*a* to 658*h* (displayed as seven different colors).

Following the placement of the wager on the play of the game, as indicated in block 104 of FIG. 1, the gaming system activates one of the symbol generators to move. In one embodiment, the gaming system activates one of the symbol generators in response to a player input, such as a player pressing a spin button. In another embodiment, the gaming system automatically activates (i.e., independent of any player input) one of the symbol generators to spin.

As further seen in block 104, this activation of one of the symbol generators causes the activation of each of the symbol generators to move. That is, based on the direct or indirect coupling of each of the symbol generators, the activation of one of the symbol generators results in the activation or movement of each of the symbol generators such that the gaming system at least partially concurrently moves each of the symbol generators. Put differently, the gaming system conveys the spinning of one symbol generator to another symbol generator (to result in the simultaneous or overlapping spinning of both symbol generators).

Figure 2B:
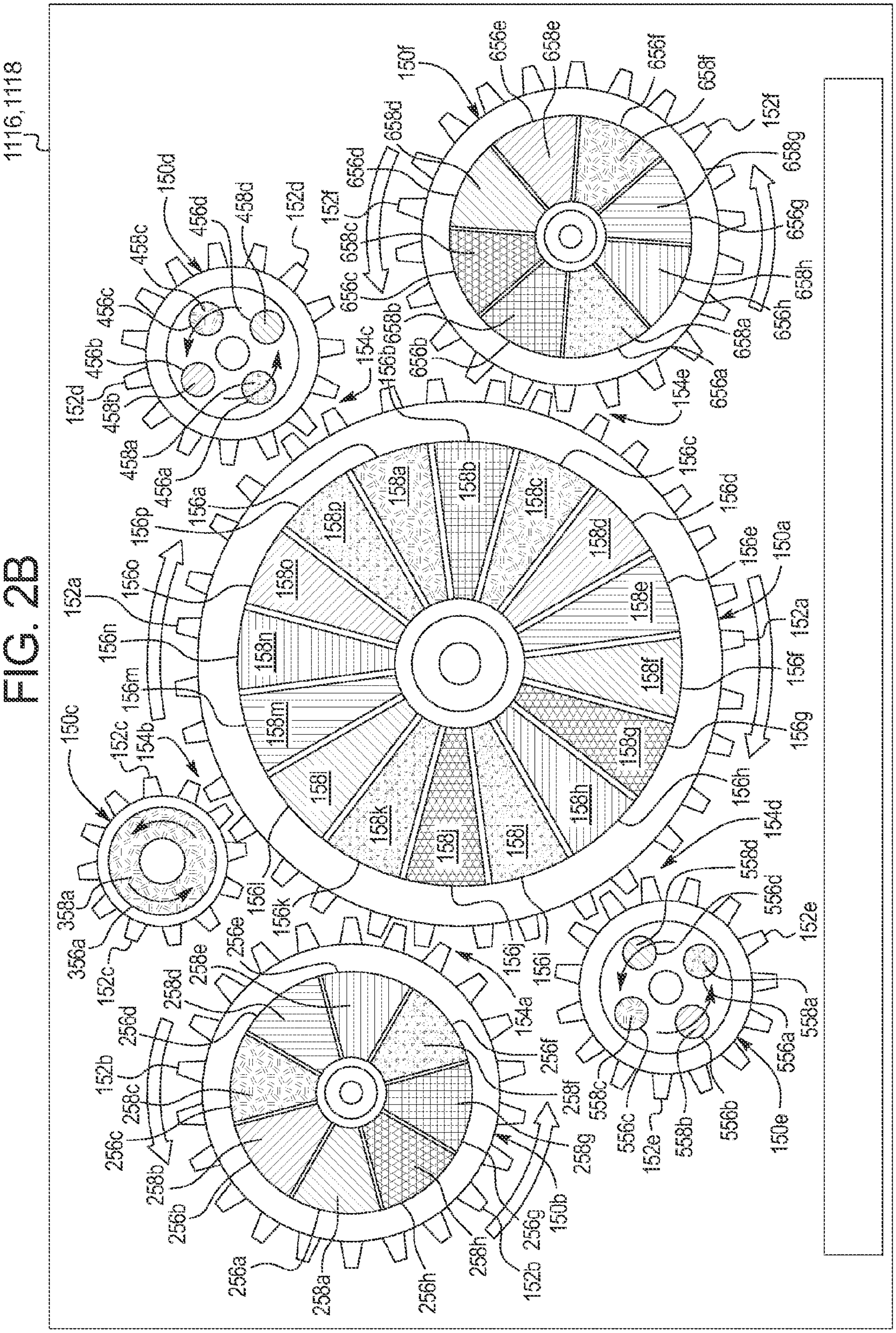

For example, as seen in FIGS. 2A to 2B, the activation of symbol generator 150*a* causes the activation of: (i) the second symbol generator 150*b*; (ii) the third symbol generator 150*c*; (iii) the fourth symbol generator 150*d*; (iv) the fifth symbol generator 150*e*; and (v) the sixth symbol generator 150*f*. Specifically, the spinning of symbol generator 150*a* causes: (i) the teeth 152*a* of the first symbol generator 150*a* to engage the teeth 152*b* of the second symbol generator 150*b* to cause the spinning of the second symbol generator 150*b*; (ii) the teeth 152*a* of the first symbol generator 150*a* to engage the teeth 152*c* of the third symbol generator 150*c* to cause the spinning of the third symbol generator 150*c*; (iii) the teeth 152*a* of the first symbol generator 150*a* to engage the teeth 152*d* of the fourth symbol generator 150*d* to cause the spinning of the second symbol generator 150*d*; (iv) the teeth 152*a* of the first symbol generator 150*a* to engage the teeth 152*e* of the fifth symbol generator 150*e* to cause the spinning of the fifth symbol generator 150*e*; and (v) the teeth 152*a* of the first symbol generator 150*a* to engage the teeth 152*f* of the sixth symbol generator 150*f* to cause the spinning of the sixth symbol generator 150*f*. In this example, the gaming system provides appropriate messages such as “SPIN ONE GEAR AND WATCH ALL OF THE GEARS SPIN” to the player visually, or through suitable audio or audiovisual displays.

Following the activation of one of the symbol generators (and the resulting activation of each of the linked symbol generators), as indicated in block 106 of FIG. 1, the gaming system randomly stops one of the symbol generators. In one embodiment, the gaming system deactivates one of the symbol generators at a random stop position in response to a player input, such as a player pressing a stop button. In another embodiment, the gaming system automatically deactivates (i.e., independent of any player input) one of the symbol generators to stop at a random stop position, such as a random stop position determined in conjunction with a random number generator.

As further seen in block 106, the one random determination of when to deactivate or stop one symbol generator results in the stopping of each of the symbol generators. That is, the gaming system conveys, either directly or indirectly, the stopping of one symbol generator to each of the symbol generators of the formed group of symbol generators (to result in the stopping of each of the symbol generators of the formed group of symbol generators).

Figure 2C:
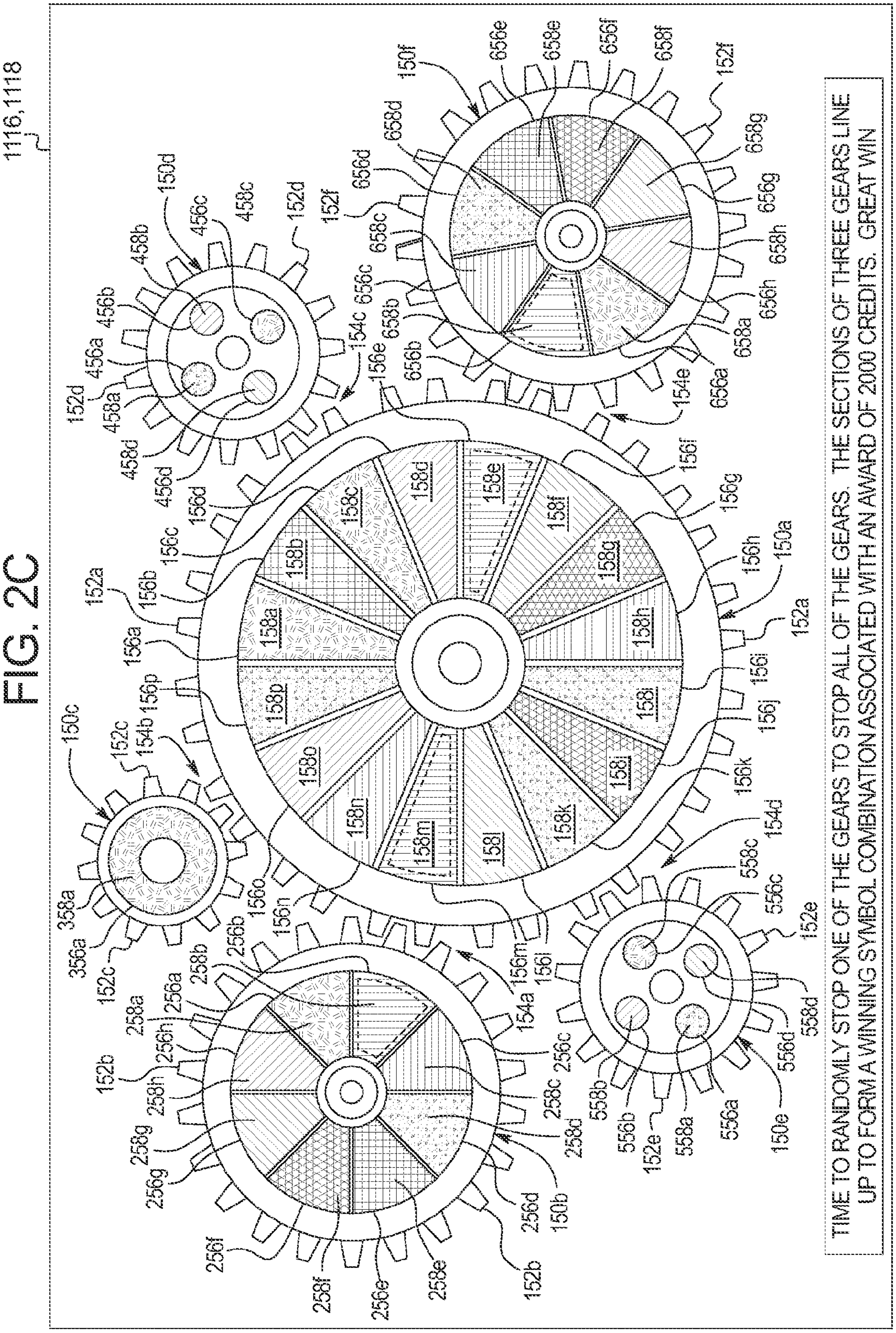

For example, as seen in FIG. 2C, the gaming system randomly stops symbol generator 150*a* at a randomly determined stop position which causes the deactivation of: (i) the second symbol generator 150*b*; (ii) the third symbol generator 150*c*; (iii) the fourth symbol generator 150*d*; (iv) the fifth symbol generator 150*e*; and (v) the sixth symbol generator 150*f*. Specifically, the stopping of symbol generator 150*a* causes: (i) the teeth 152*a* of the first symbol generator 150*a* to engage the teeth 152*b* of the second symbol generator 150*b* to stop the spinning of the second symbol generator 150*b*; (ii) the teeth 152*a* of the first symbol generator 150*a* to engage the teeth 152*c* of the third symbol generator 150*c* to stop the spinning of the third symbol generator 150*c*; (iii) the teeth 152*a* of the first symbol generator 150*a* to engage the teeth 152*d* of the fourth symbol generator 150*d* to stop the spinning of the second symbol generator 150*d*; (iv) the teeth 152*a* of the first symbol generator 150*a* to engage the teeth 152*e* of the fifth symbol generator 150*e* to stop the spinning of the fifth symbol generator 150*e*; and (v) the teeth 152*a* of the first symbol generator 150*a* to engage the teeth 152*f* of the sixth symbol generator 150*f* to stop the spinning of the sixth symbol generator 150*f*. In this example, the gaming system provides appropriate messages such as “TIME TO RANDOMLY STOP ONE OF THE GEARS TO STOP ALL OF THE GEARS” to the player visually, or through suitable audio or audiovisual displays.

Following the deactivation or stopping of one of the symbol generators (and the resulting deactivation or stopping of each of the linked symbol generators of the formed group of symbol generators), as indicated in diamond 108 of FIG. 1, the gaming system determines whether the symbols currently displayed at or adjacent to the evaluations points or areas of the different symbol generators form any winning symbol combinations. That is, for each pair of interlocking symbol generators, the gaming system determines whether the symbols of the sections of the symbol generators currently positioned at or adjacent to the evaluation point or area of the two interlocking symbol generators form part or all of a winning symbol combination (i.e., the evaluation points or area form one or more paylines which the gaming system evaluates for any winning symbol combinations).

If the symbols currently displayed at or adjacent the evaluation points of different symbol generators do not form any winning symbol combinations, the gaming system terminates the play of the game and returns to block 102 for another placement of another wager on another play of the game.

On the other hand, if the symbols currently displayed at or adjacent to the evaluation points of the different symbol generators form any winning symbol combinations, the gaming system determines and displays which awards are associated with the formed winning symbol combinations as indicated in blocks 108 and 110. The gaming system then terminates the play of the game and returns to block 102 for another placement of another wager on another play of the game.

For example, as further seen in FIG. 2C, the gaming system determines that: (i) symbol 258*b* of section 256*b* of symbol generator 150*b* currently displayed at the first intersection point 154*a*, (ii) symbol 158*m* of section 156*m* of symbol generator 150*a* currently displayed at the first intersection point 154*a*, (iii) symbol 158*e* of section 156*e* of symbol generator 150*a* currently displayed at the fifth intersection point 154*e*, and (iv) symbol 658*b* of section 656*b* of symbol generator 150*f* currently displayed at the fifth intersection point 154*e* form a winning symbol combination associated with an award of two-thousands credits. That is, the gaming system determines that the symbols generated along a payline (formed or defined by at least the first intersection area and the fifth intersection area) forms a winning symbol combination. In this example, the gaming system provides appropriate messages such as “THE SECTIONS OF THREE GEARS LINE UP TO FORM A WINNING SYMBOL COMBINATION ASSOCIATED WITH AN AWARD OF 2000 CREDITS” and “GREAT WIN” to the player visually, or through suitable audio or audiovisual displays.

In one embodiment, as seen in FIGS. 2A to 2C, if the gaming system determines that a plurality of symbols at one or more intersection points of a plurality of sections of a plurality of symbol generators forms a winning symbol combination, the gaming system provides one or more awards to the player. In different embodiments, one or more awards provided in association with such formed winning symbol combinations include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product such as a free teddy bear, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

Figure 3:
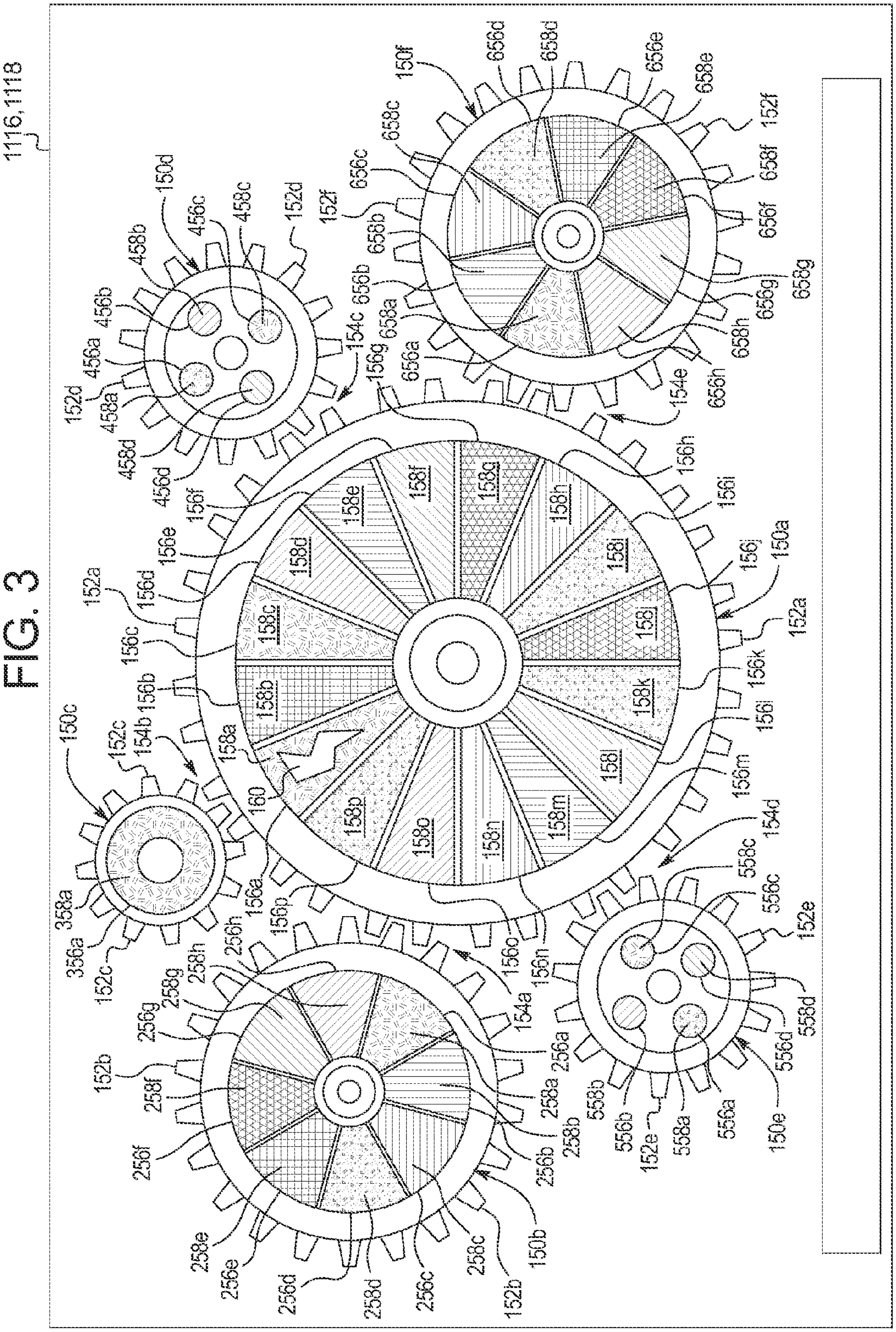
FIG. 3 is a front view of one embodiment of the gaming system disclosed herein illustrating the activation of one symbol generator causing the activation of each of the linked symbol generators to trigger a bonus game.

In another embodiment, one or more symbols of one or more sections of one or more symbol generators are associated with a triggering of a secondary game. In this embodiment, if the gaming system determines that a plurality of symbols at one or more intersection points of a plurality of sections of a plurality of symbol generators are each associated with the triggering of a secondary game, the gaming system triggers one or more plays of a secondary game. For example, as seen in FIG. 3, one of the symbols 160 one of the sections 156*a* of the first symbol generator 150*a* is associated with a secondary game, and the one symbol 358*a* of the one section 356*a* of the third symbol generator 150*c* is also associated with the secondary game. As further seen in FIG. 3, since the gaming system determined that symbol 160 of section 156*a* of the first symbol generator 150*a* and symbol 358*a* of the one section 356*a* of the third symbol generator 150*c* are each currently displayed at the second intersection point 154*b*, the gaming system triggers the play of the secondary game associated with these symbols. As seen in this embodiment, since the third symbol generator 150*c* includes a single section 356*a* having a single symbol 358*a* associated with the triggering of a secondary game, each time the third symbol generator is spun, the single symbol 358*a* will be positioned at or adjacent to the second intersection point 154*b*. In this example, the gaming system provides appropriate messages such as "THE BONUS SYMBOL LINED UP WITH THE BONUS GEAR, TIME TO TRIGGER A BONUS GAME" to the player visually, or through suitable audio or audiovisual displays.

In different embodiments, one or more secondary games include, but are not limited to: a play of any suitable slot game; a play of any suitable free spins or free game activations; a play of any suitable wheel game; a play of any suitable card game; a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable stacked wilds game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable skill game; a play of any suitable auction game; a play of any suitable reverse-auction game; a play of any suitable group game; a play of any suitable game in a service window; a play of any suitable game on a mobile device; and/or a play of any suitable game disclosed herein.

In another embodiment, the symbols of the sections of at least one symbol generator are each associated with one of a plurality of modifiers (i.e., a modifier generator) and the symbols of the sections of at least one symbol generator are associated with one of a plurality of values (i.e., a value generator), wherein the modifier generator is directly coupled with the value generator. In operation of this embodiment, after both the modifier generator and value generator collectively stop and start, the gaming system determines an award based on the modifier of the modifier generator and the value of the value generator which are each displayed at or adjacent the intersection point or area of these two symbol generators.

In another embodiment, one or more symbols of one or more sections of one or more symbol generators are associated with an activation, modification or reconfiguration of one or more features or attributes associated with one or more plays of one or more primary games and/or one or more plays of any suitable secondary game. In this embodiment, if the gaming system determines that a plurality of symbols at one or more intersection points of a plurality of sections of a plurality of symbol generators are each associated with the activation, modification or reconfiguration of one or more features or attributes associated with one or more plays of one or more primary games and/or one or more plays of any suitable secondary game, the gaming system activates, modifies or reconfigures such features or attributes based on the determined symbol combination. In different such embodiments, these activations, modifications and reconfigurations include, but are not limited to:

i. a stacked wild symbols feature;
ii. a book-end wild symbols feature;
iii. an expanding wild symbols feature;
iv. a wild reel feature;
v. a retrigger symbol feature;
vi. an anti-terminator symbol feature;
vii. a locking reel feature,
viii. a locking symbol position feature;
ix. a modification of an amount of credits of a credit balance;
x. a modification of an amount of promotional credits;
xi. a modification of a placed wager amount;
xii. a modification of a wager amount available to be placed;
xiii. a modification of a placed side wager amount;
xiv. a modification of a side wager amount available to be placed;
xv. a modification of a rate of earning player tracking points;
xvi. a modification of a number of wagered on paylines;
xvii. a modification of a number of paylines available to be wagered on;

xviii. a modification of a wager placed on one or more paylines (or on one or more designated paylines);

xix. a modification of a number of ways to win wagered on;

xx. a modification of a number of available ways to win to be wagered on;

xxi. a modification of a wager placed on one or more ways to win (or on one or more designated ways to win);

xxii. a modification of a paytable utilized for a play of a game;

xxiii. an application of a modifier, such as a multiplier or an additional quantity of credits, to one or more awards of a paytable utilized for a play of a game, xxiv. a modification of an average expected payback percentage of a play of a game;

xxv. a modification of an average expected payout of a play of a game;

xxvi. a modification of one or more awards available;

xxvii. a modification of a range of awards available;

xxviii. a modification of a type of awards available;

xxix. a modification of one or more progressive awards;

xxx. a modification of which progressive awards are available to be won;

xxxi. a modification of one or more modifiers, such as multipliers, available;

xxxii. a modification of an activation of a reel (or a designated reel);

xxxiii. a modification of an activation of a plurality of reels;

xxxiv. a modification of a generated outcome (or a designated generated outcome);

xxxv. a modification of a generated outcome (or a designated generated outcome) associated with an award over a designated value;

xxxvi. a modification of a generated outcome (or a designated generated outcome) on a designated payline;

xxxvii. a modification of a generated outcome (or a designated generated outcome) in a scatter configuration;

xxxviii. a modification of a winning way to win (or a designated winning way to win);

xxxix. a modification of a designated symbol or symbol combination;

xl. a modification of a generation of a designated symbol or symbol combination on a designated payline;

xli. a modification of a generation of a designated symbol or symbol combination in a scatter configuration;

xlii. a modification of a triggering event of a play of a secondary or bonus game;

xliii. a modification of an activation of a secondary or bonus display (such as an award generator);

xliv. a modification of an activation of a community award generator;

xlv. a modification of a generated outcome (or a designated generated outcome) in a secondary game;

xlvi. a modification of an amount of free spins provided;

xlvii. a modification of a game terminating or ending condition;

xlviii. a modification of how one or more aspects of one or more games (e.g., colors, speeds, sound) are displayed to a player;

xlix. a modification of access to different websites a player may access via a mobile device;

l. a modification of audio-visual content a player may access via a mobile device;

li. a modification of a player's avatar; and/or lii. a modification of any game play feature associated with any play of any game disclosed herein.

Figure 4:
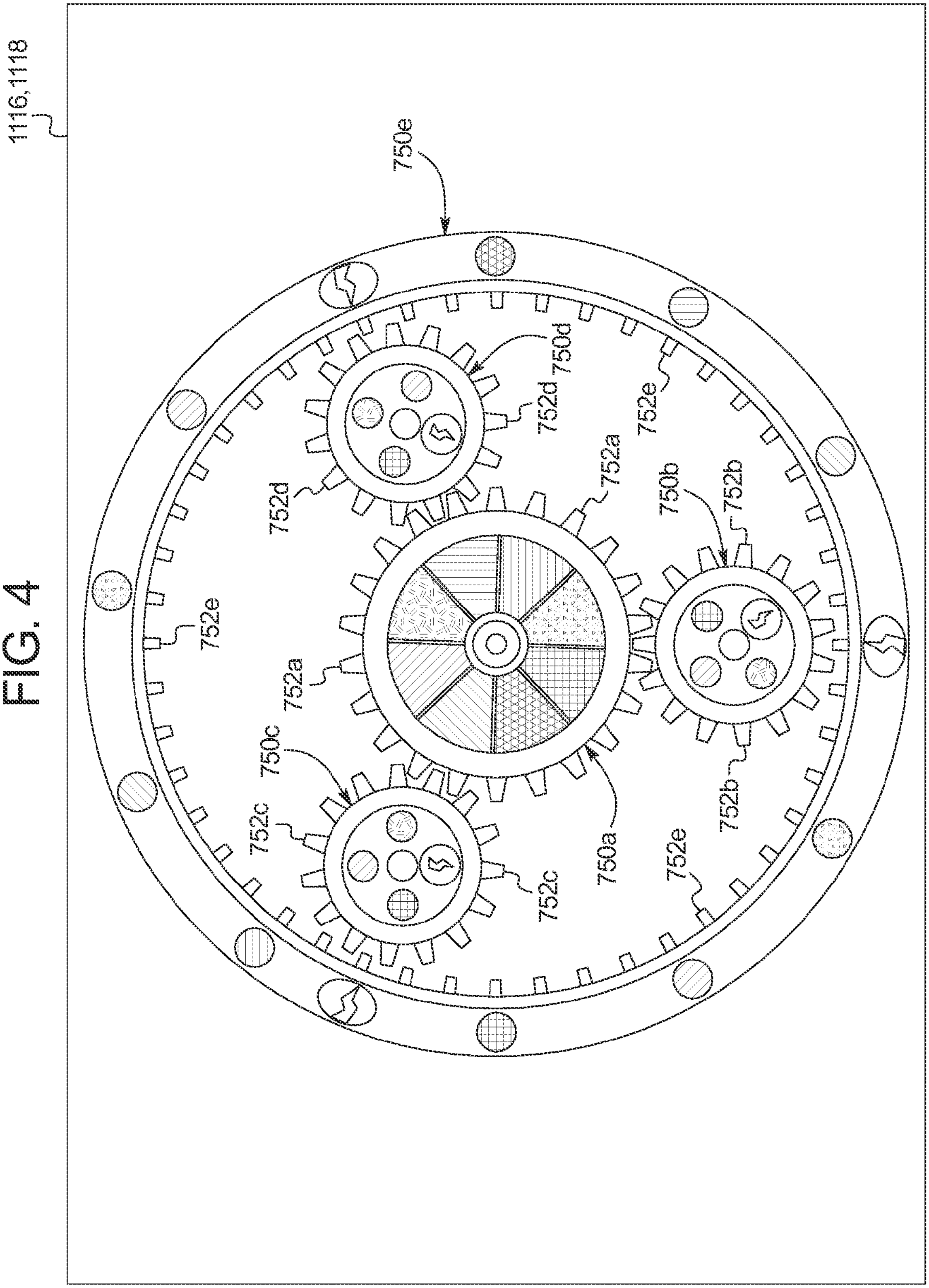
FIG. 4 is a front view of alternative embodiment of the gaming system disclosed herein illustrating the activation of one symbol generator causing the activation of each of the linked symbol generators.

In one embodiment, as seen in FIGS. 2A to 2C, the plurality of symbol generators are arranged such that a primary symbol generator 150*a* is directly coupled to each a plurality of other symbol generators 150*b* to 150*f* (and the plurality of other symbol generators are indirectly coupled to each other via the primary symbol generator). In another embodiment, the plurality of symbol generators are arranged such that each symbol generator is directly coupled to a plurality of other symbol generators. In this embodiment, each of the symbol generators are associated with at least two intersection points or areas wherein the teeth of that symbol generator engage the teeth of another symbol generator. For example, as seen in FIG. 4, for the wagered on play of the game, the gaming system displays five symbol generators 750 displayed as six interlocking planetary gears each including a plurality of teeth 752. In this example, the gaming system displays each symbol generator 750 directly or indirectly interlocked with or otherwise linked to each of the other symbol generators. Specifically, the gaming system displays: (i) a first symbol generator 750*a* (having a first plurality of teeth 752*a*) directly interlocked or otherwise linked to: (A) a second symbol generator 750*b* (having a second plurality of teeth 752*b*) at a first intersection point or area 754*a*; (B) a third symbol generator 750*c* (having a third plurality of teeth 752*c*) at a second intersection point or area 754*b*; and (C) a fourth symbol generator 750*d* (having a fourth plurality of teeth 752*d*) at a third intersection point or area 754*c*; and (ii) a fifth symbol generator 750*e* (having a fifth plurality of teeth 752*e*) directly interlocked or otherwise linked to: (A) the second symbol generator 750*b* (having the second plurality of teeth 752*b*) at a fourth intersection point or area 754*d*; (B) the third symbol generator 750*c* (having the third plurality of teeth 752*c*) at a fifth intersection point or area 754*e*; and (C) the fourth symbol generator 750*d* (having the fourth plurality of teeth 752*d*) at a sixth intersection point or area 754*f*. In this example embodiment, as described above, the spinning and stopping of a primary symbol generator is conveyed to each of the other symbol generators (which are either directly or indirectly coupled to the spun and stopped primary symbol generator). It should be appreciated that any suitable configuration of a primary symbol generator affecting one or more other directly or indirectly interlocking symbol generators (e.g., a wheel and chain configuration) may be employed in association with the present disclosure.

In one embodiment, as described above, the plurality of symbol generators form a group or set of linked symbol generators. In another embodiment, the plurality of symbol generators form a plurality of groups or sets of linked symbol generators. In certain embodiments, one or more of the symbol generators of one or more of the groups of linked symbol generators are different. In certain embodiments, one or more of the symbols of one or more of the symbol generators of one or more of the groups of linked symbol generators are different. In certain embodiments, the quantity of symbol generators and/or the quantity of sections per symbol generator in different groups of linked symbol generators are the same. In certain embodiments, the quantity of symbol generators and/or the quantity of sections per symbol generator in different groups of linked symbol generators are different.

In one embodiment, the wagered on play of the game is associated with the employment of one group of linked symbol generators. In one such embodiment, the gaming system selects which group of symbol generators to employ in association with a play of a game. In another such embodiment, the gaming system enables the player to select which group of linked symbol generators to employ in association with a play of a game. In these embodiments, while the different groups of linked symbol generators may employ the same or different paytables, the average expected payout of each group of linked symbol generators is the same (or within a designated range of each other).

In another embodiment, the wagered on play of the game is associated with a plurality of groups of symbol generators. In one such embodiment, the player's wager is associated with generating and displaying symbols for each of the symbol generators of each of the groups of linked symbol generators. In another such embodiment, the gaming system enables a player to place a plurality of wagers on a plurality of available games wherein each game includes or is otherwise associated with a group of symbol generators (i.e., the gaming system enables the player to simultaneously, concurrently or overlappingly play a plurality of games that each employ a different group of symbol generators).

In one embodiment employing a plurality of groups of linked symbol generators, upon an occurrence of a symbol generator group connection event, the gaming system adds one or more symbol generators which connect different groups of linked symbol generators. That is, the gaming system merges at least two distinct groups of interlocked symbol generators into one group of interlocked symbol generators. Such connection or bridging symbol generators enable the player the opportunity to win additional awards (i.e., increase the average expected payout for a play of the game) by creating symbol combinations between previously unlinked symbol generators. In one embodiment, a symbol generator group connection event occurs based on a displayed event in a play of one or more displayed primary games. In another embodiment, the gaming system tracks the occurrences of one or more suitable events occurring at or in association with one or more players and/or one or more games and determines, based on these tracked events, whether a symbol generator group connection event occurs. In another embodiment, the gaming system defines one or more game play parameters, wherein each time a player's tracked game play activity satisfies the defined parameter, a symbol generator group connection event occurs. In another embodiment, a symbol generator group connection event occurs independent of any displayed event in any play of any game.

In one embodiment, as described above, the gaming system employs a static quantity of symbol generators per game played. In another embodiment, the gaming system employs a variable quantity of symbol generators per game played. In another embodiment, the gaming system enables a player to purchase one or more symbol generators per game played. In one such embodiment, different wager amounts are associated with generating and displaying symbols for different quantities of symbol generators. For example, a first wager amount is associated with a first quantity of linked symbol generators and a second, greater wager amount is associated with a second, greater quantity of linked symbol generators. In another embodiment, the gaming system enables a player to purchase one or more additional symbol generations of one or more symbol generators. In one such embodiment, different amounts are associated with different quantities of symbol generations of the symbol generators. In different embodiments, the gaming system enables the players to purchase additional symbol generator activations prior to and/or after the symbol generators are activated as described above.

In another embodiment, upon an occurrence of an additional symbol generator event, the gaming system associates another symbol generator with the player. In this embodiment, the player accumulates one or more symbol generators wherein such accumulated symbol generators enable the player the opportunity to win additional awards (i.e., increase the average expected payout for a play of the game) by creating symbol combinations between previously unlinked symbol generators. In one embodiment, an additional symbol generator event occurs based on a displayed event in a play of one or more displayed primary games. In another embodiment, the gaming system tracks the occurrences of one or more suitable events occurring at or in association with one or more players and/or one or more games and determines, based on these tracked events, whether an additional symbol generator event occurs. In another embodiment, the gaming system defines one or more game play parameters, wherein each time a player's tracked game play activity satisfies the defined parameter, an additional symbol generator event occurs. In another embodiment, an additional symbol generator event occurs independent of any displayed event in any play of any game.

In another embodiment, upon an occurrence of an unlinking symbol generator event, the gaming system unlinks or disassociates one of the symbol generators from the group or interlocked symbol generators. In one such embodiment, upon an occurrence of an unlinking symbol generator event and following the generation of a plurality of symbols of the interlocked symbol generators, the gaming system unlinks one of the symbol generators and respins the unlinked symbol generator to generate another symbol. In this embodiment, the gaming system then evaluates the symbols of the interlocked symbol generators and this newly generated symbol of the unlinked symbol generator to determine if any winning symbol combinations are formed. In one embodiment, an unlinking symbol generator event occurs based on a displayed event in a play of one or more displayed primary games. In another embodiment, the gaming system tracks the occurrences of one or more suitable events occurring at or in association with one or more players and/or one or more games and determines, based on these tracked events, whether an unlinking symbol generator event occurs. In another embodiment, the gaming system defines one or more game play parameters, wherein each time a player's tracked game play activity satisfies the defined parameter, an unlinking symbol generator event occurs. In another embodiment, an unlinking symbol generator event occurs independent of any displayed event in any play of any game.

In one embodiment, the gaming system enables the player to rotate or arrange the plurality of symbol generators prior to the activation of one of the symbol generators (and the resulting activation of each of the linked symbol generators). In another embodiment, the gaming system enables the player to rotate or arrange (i.e., nudge) the plurality of symbol generators after the activation and deactivation of one of the symbol generators (and the resulting activation and deactivation of each of the linked symbol generators). In another embodiment, the gaming system randomly determines different starting states of one or more of the linked symbol generators for different plays of the game.

It should be appreciated that by varying the quantity of symbol generators employed, varying the size of one or more symbol generators employed (i.e., how many sections of one or more symbol generators) and/or varying the configuration of such symbol generators (i.e., which symbol generators are adjacent to which symbol generators), the gaming system is configured to modify the different symbol combinations available to be generated. That is, by modifying one or more aspects of one or more symbol generators utilized, the gaming system is configured to modify the player's gaming experience.

In one such embodiment, the gaming system modifies one or more value symbols of one or more sections of one or more linked symbol generators. In another such embodiment, the gaming system employs one or more mystery symbols of one or more sections of one or more linked symbol generators. In different embodiments, if a symbol generator section of a mystery symbol is positioned at or adjacent the evaluation area of two interlocking symbol generators, the gaming system determines a symbol and/or determines one or more features of the mystery symbol. In these embodiments, such modified symbols and/or mystery symbols vary the results available for the player from game play to game play and thus provide an increased level of excitement for certain players.

In one embodiment, the plurality of symbol generators spin or rotate at the same (or similar) rate. In another embodiment, at least two of the symbol generators spin or rotate at different rates. In one such embodiment, the plurality of symbol generators are different sizes and thus spin or rotate at different rates. In another such embodiment, the plurality of symbol generators are the same size but spin or rotate at different rates based on the quantity of linkages or teeth that interact between the symbol generators. In these various embodiments where the symbol generators rotate at different rates, the symbols displayed by two interlocking symbol generators at their intersection points may vary from spin to spin. That is, for a symbol on a first symbol generator that is displayed at the intersection point, a different symbol from the second symbol generator may be displayed, leading to increased number of possible outcomes.

In one embodiment, the gaming system causes at least one display device of at least one electronic gaming machine to display the play of the game employing one or more groups of linked symbol generators. In another embodiment, in addition or in alternative to each electronic gaming machine displaying the play of the game employing one or more groups of linked symbol generators, the gaming system causes one or more community or overhead display devices to display part or all of the play of the game employing one or more groups of linked symbol generators to one or more other players or bystanders either at a gaming establishment or viewing over a network, such as the internet. In another embodiment, in addition or in alternative to each electronic gaming machine displaying the play of the game employing one or more groups of linked symbol generators, the gaming system causes one or more internet sites to each display the play of the game employing one or more groups of linked symbol generators such that a player is enabled to log on from a personal web browser. In another such embodiment, the gaming system enables the player to play one or more games on one device while viewing the play of the game employing one or more groups of linked symbol generators from another device, such as a desktop or laptop computer. In another embodiment, the gaming system includes one or more mechanical symbol generators. In this embodiment, the symbol generators include mechanical gears, wherein the teeth of one gear engage the teeth of another gear to cause movement.

In one embodiment, as described above, a game employing linked symbol generators is a primary or base wagering game. In this embodiment, upon a placement of a wager by a player, the gaming system triggers a play of the game employing linked symbol generators.

In another embodiment, the game employing linked symbol generators is a secondary or bonus game which is triggered in response to an occurrence of a game employing linked symbol generators triggering event. In one such embodiment, a game employing linked symbol generators triggering event occurs, based on an outcome associated with one or more plays of any primary game and/or an outcome associated with one or more plays of any secondary game. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a game employing linked symbol generators triggering event to occur.

In another embodiment, the gaming system does not provide any apparent reasons to the players for a game employing linked symbol generators triggering event to occur. In these embodiments, such determinations are not triggered by an event in a primary game or based specifically on any of the plays of any primary games or on any of the plays of any secondary games. That is, these events occur without any explanation or alternatively with simple explanations.

In one such embodiment, a game employing linked symbol generators triggering event occurs based on an amount of coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes one or more of such events or conditions to occur. In another such embodiment, a game employing linked symbol generators triggering event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the bonus threshold virtual currency-in amount, the gaming system causes one or more of such events or conditions to occur. In different embodiments, the threshold coin-in amount and/or the virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a game employing linked symbol generators triggering event occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the bonus threshold coin-out amount, the gaming system causes one or more of such events or conditions to occur. In another such embodiment, a game employing linked symbol generators triggering event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the bonus threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a game employing linked symbol generators triggering event occurs based on a predefined variable reaching a defined parameter threshold. For example, when the 500,000$^{th}$ player has played a gaming device of the gaming system (ascertained from a player tracking system), one or more of events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another alternative embodiment, a game employing linked symbol generators triggering event occurs based on a quantity of games played. In this embodiment, a quantity of games played is set for when one or more of events or conditions will occur. In one embodiment, such a set quantity of games played is based on historic data.

In another alternative embodiment, a game employing linked symbol generators triggering event occurs based on time. In this embodiment, a time is set for when one or more of events or conditions will occur. In one embodiment, such a set time is based on historic data.

In another alternative embodiment, a game employing linked symbol generators triggering event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for events or conditions to occur based on the player's card level.

In another alternative embodiment, a game employing linked symbol generators triggering event occurs based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of events occur may the same as, substantially the same as, or different than the criteria for determining whether a player is in active status or inactive status for another one of such events to occur.

In another alternative embodiment, a game employing linked symbol generators triggering event occurs based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of events or conditions occur. It should be appreciated that any suitable manner of causing a game employing linked symbol generators triggering event to occur may be implemented in accordance with the gaming system and method disclosed herein.

It should be appreciated that any of the above-described game employing linked symbol generators triggering events may be combined in one or more different embodiments.

Alternative Embodiments

It should be appreciated that in different embodiments, one or more of:

i. a quantity of symbol generators to employ for a play of a game;
ii. which symbol generators to employ for a play of a game;
iii. a quantity of sections for one or more symbol generators;
iv. which symbols are associated with which sections of which symbol generators;
v. which benefits (i.e., awards, triggered secondary games, employed modifiers) are associated with which lined up symbol combinations;
vi. which symbol generators are directly coupled with each other;
vii. which symbol generators are indirectly coupled with each other;
viii. which symbol generator is activated to spin (i.e., which symbol generator is a primary symbol generator pertaining to initiating the spinning of each of the symbol generators);
ix. which symbol generator is deactivated to stop spinning (i.e., which symbol generator is a primary symbol generator pertaining to initiating the stopping of each of the symbol generators);
x. an arrangement of the plurality of linked symbol generators (i.e., where is the point of intersection of different directly coupled symbol generators);
xi. a quantity of groups of symbol generators to employ in one or more plays of one or more games;
xii. which group of symbol generators to employ in one or more plays of one or more games;
xiii. whether an additional symbol generator event occurs;
xiv. if an additional symbol generator event occurs, which symbol generator(s) to add to the employed group of symbol generators;
xv. whether a symbol generator group connection event occurs;
xvi. if a symbol generator group connection event occurs, which symbol generator(s) to add to connect different groups of symbol generators; and/or
xvii. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 5A:
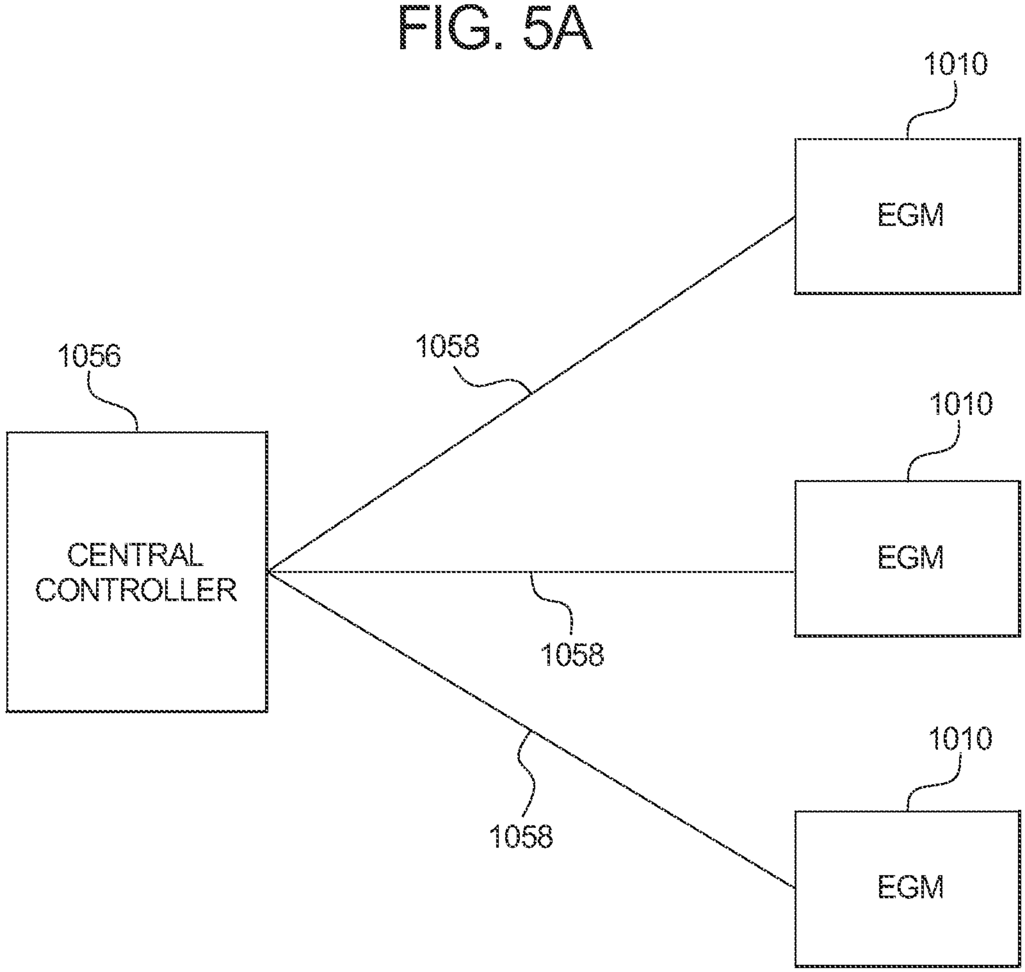
FIG. 5A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 5A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 5B:
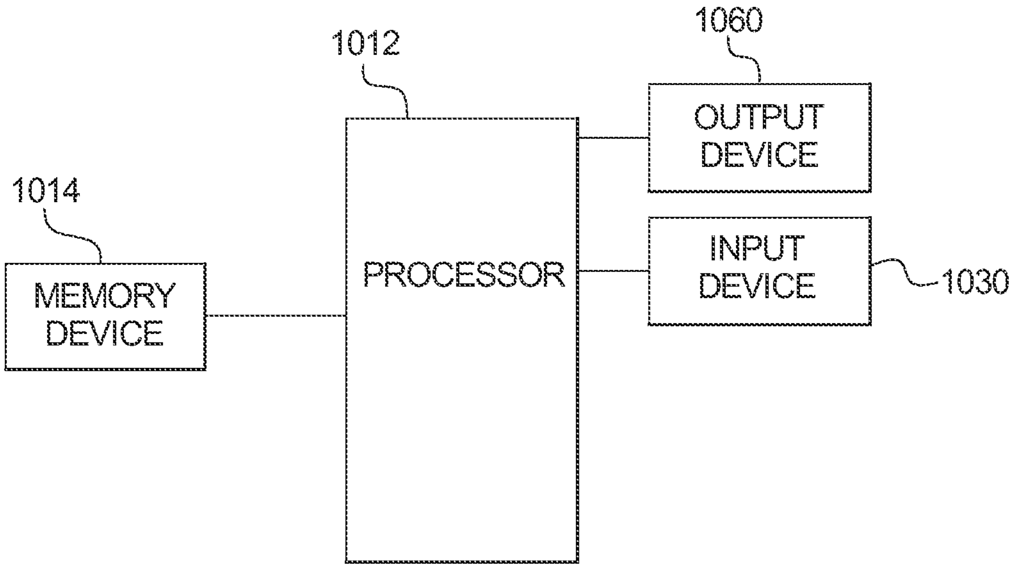
FIG. 5B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 5B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 5B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 6A:
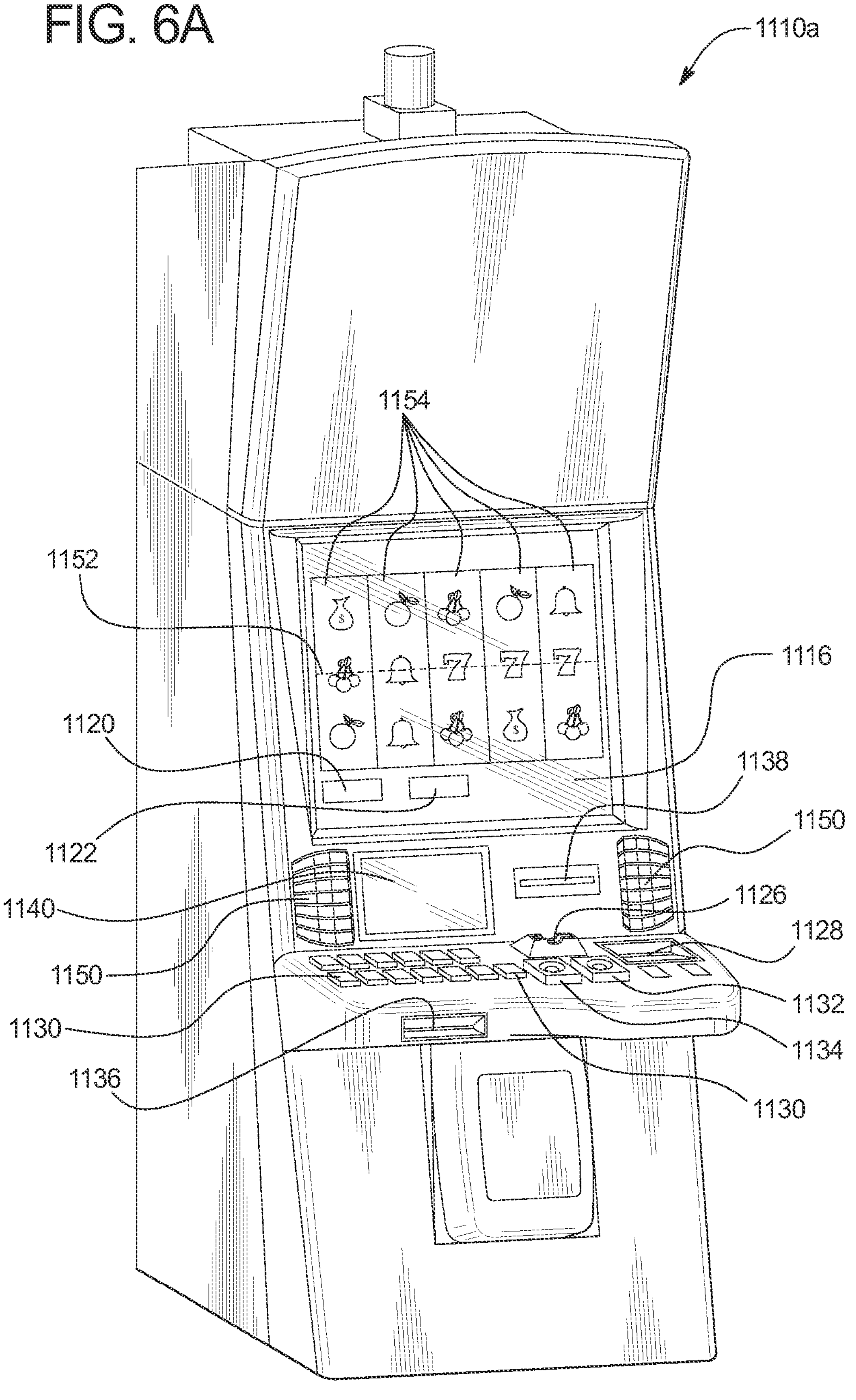
FIGS. 6A and 6B are perspective views of example alternative embodiments of the gaming system disclosed herein.
Figure 6B:
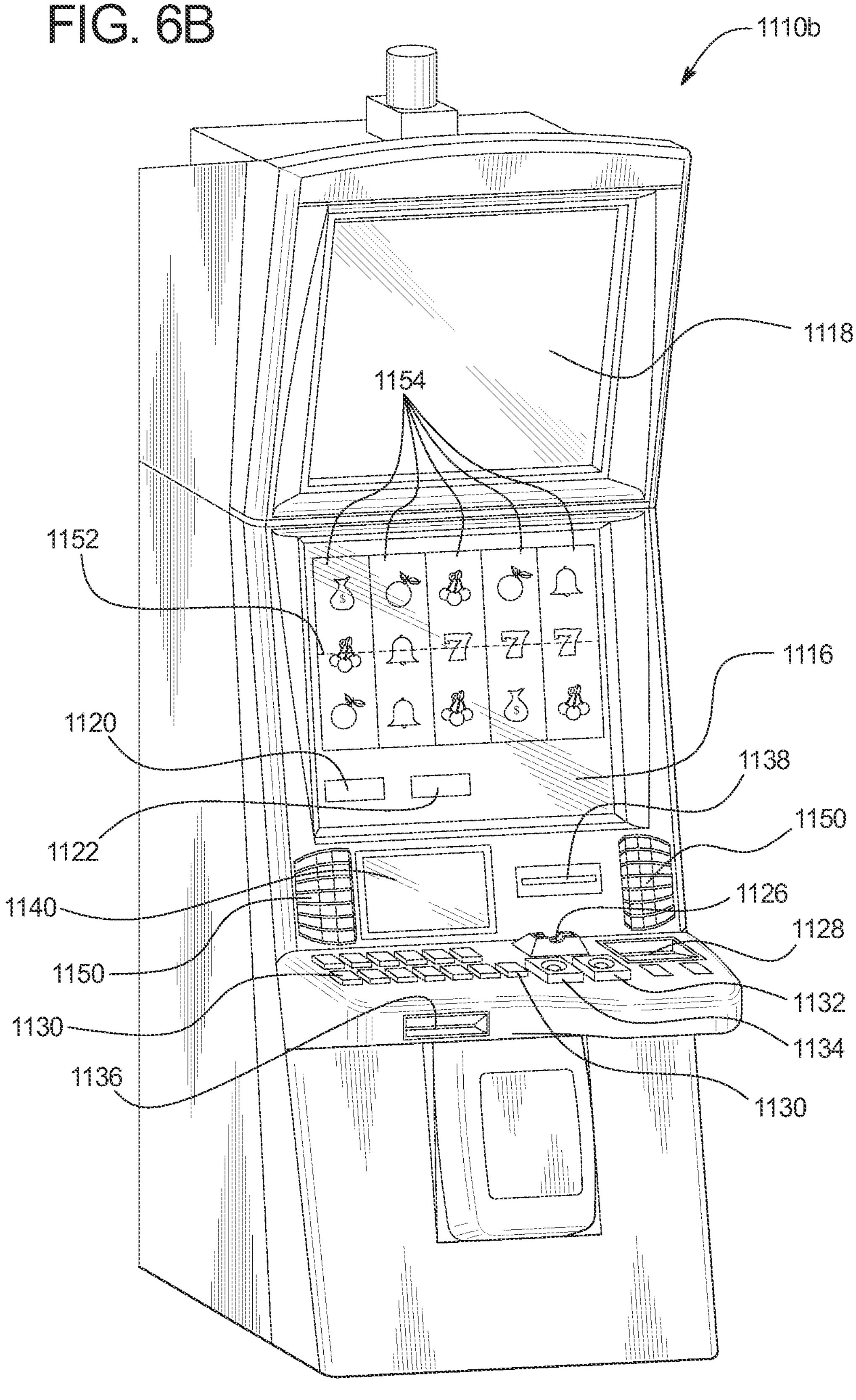

In various embodiments, the EGM includes one or more input devices. The input devices may include any suitable device that enables an input signal to be produced and received by the at least one processor of the EGM. The example EGM illustrated in FIG. 5B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 6A and 6B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 6A and 6B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 6A and 6B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 6A and 6B each include a card reader 1138. The card reader is configured to read a player identification card inserted into the card reader.

In various embodiments, the EGM includes one or more output devices. The example EGM illustrated in FIG. 5B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 6A includes a central display device 1116, a player tracking display 1140, a credit display 1120, and a bet display 1122. The example EGM illustrated in FIG. 6B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 6A and 6B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 6A and 6B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 6A and 6B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 6A and 6B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281561 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 6A and 6B each include a payline 1152 and a plurality of reels 1156. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

at least one display device supported by the housing;

a plurality of input devices supported by the housing, said plurality of input devices including:

(i) an acceptor, and (ii) a cashout device;

at least one processor; and at least one memory device which stores a plurality of instructions, which when executed by the at least one processor, cause the at least one processor to operate with the at least one display device and the plurality of input devices to:

(a) if a physical item is received via the acceptor, establish a credit balance based, at least in part, on a monetary value associated with the received physical item, (b) display a set of a plurality of symbol generators, wherein:

(i) each symbol generator includes at least one section associated with at least one symbol, (ii) each symbol generator is directly coupled to at least another one of the symbol generators such that two coupled symbol generators define an evaluation area, and (iii) at least one of the symbol generators is indirectly coupled to at least another one of the symbol generators such that each of the symbol generators of the set of symbol generators are coupled to each other, (c) activate one of the symbol generators of the set of symbol generators to start moving, wherein the activation of one of the symbol generators causes an activation of each of the coupled symbol generators of the set of symbol generators to start moving, (d) randomly deactivate one of the symbol generators of the set of symbol generators to stop moving, wherein the deactivation of one of the symbol generators causes a deactivation of each of the coupled symbol generators of the set of symbol generators to stop moving, (e) determine if any of the symbols associated with any of the sections stopped at the defined evaluation areas form any winning symbol combinations, (f) if a plurality of the symbols of a plurality of the sections stopped at at least one of the defined evaluation areas form at least one winning symbol combination, display one of a plurality of awards for each formed winning symbol combination, and (g) if a cashout input is received via the cashout device, cause an initiation of any payout associated with the credit balance.

2. The gaming system of claim 1, wherein when executed by the at least one processor, the plurality of instructions cause the at least one processor to display another set of another plurality of symbol generators, wherein each of the symbol generators of the other set of symbol generators are coupled to each other.

3. The gaming system of claim 2, wherein when executed by the at least one processor if a symbol generator group connection event occurs, the plurality of instructions cause the at least one processor to merge both sets of symbol generators to form one merged set of symbol generators.

4. The gaming system of claim 2, wherein when executed by the at least one processor, the plurality of instructions cause the at least one processor to enable a player to wager on a play of a game associated with each of the sets of symbol generators.

5. The gaming system of claim 2, wherein when executed by the at least one processor, the plurality of instructions cause the at least one processor to enable a player to individually wager on a play of each of a plurality of games, each game being individually associated with one of the sets of symbol generators.

6. The gaming system of claim 1, wherein different wager amounts are associated with different quantities of symbol generators in the set of symbol generators.

7. The gaming system of claim 1, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

8. A method of operating a gaming system, for a play of a game, said method comprising:

(a) causing at least one display device to display a set of a plurality of symbol generators, wherein:

(i) each symbol generator includes at least one section associated with at least one symbol, (ii) each symbol generator is directly coupled to at least another one of the symbol generators such that two coupled symbol generators define an evaluation area, and (iii) at least one of the symbol generators is indirectly coupled to at least another one of the symbol generators such that each of the symbol generators of the set of symbol generators are coupled to each other, (b) causing at least one processor to execute a plurality of instructions to activate one of the symbol generators of the set of symbol generators to start moving, wherein the activation of one of the symbol generators causes an activation of each of the coupled symbol generators of the set of symbol generators to start moving, (c) causing the at least one processor to execute the plurality of instructions to randomly deactivate one of the symbol generators of the set of symbol generators to stop moving, wherein the deactivation of one of the symbol generators causes a deactivation of each of the coupled symbol generators of the set of symbol generators to stop moving, (d) causing the at least one processor to execute the plurality of instructions to determine if any of the symbols associated with any of the sections stopped at the defined evaluation areas form any winning symbol combinations, and (e) if a plurality of the symbols of a plurality of the sections stopped at at least one of the defined evaluation areas form at least one winning symbol combination, causing the at least one display device to display one of a plurality of awards for each formed winning symbol combination, wherein a credit balance is increasable based on any displayed awards associated with each formed winning symbol combination, said credit balance being increasable via an acceptor of a physical item associated with a monetary value, and said credit balance being decreasable via a cashout device.

9. The method of claim 8, which includes causing the at least one display device to display another set of another plurality of symbol generators, wherein each of the symbol generators of the other set of symbol generators are coupled to each other.

10. The method of claim 9, which includes, if a symbol generator group connection event occurs, causing the at least one processor to execute the plurality of instructions to merge both sets of symbol generators to form one merged set of symbol generators.

11. The method of claim 9, which includes enabling a player to wager on a play of a game associated with each of the sets of symbol generators.

12. The method of claim 9, which includes enabling a player to individually wager on a play of each of a plurality of games, each game being individually associated with one of the sets of symbol generators.

13. The method of claim 8, wherein different wager amounts are associated with different quantities of symbol generators in the set of symbol generators.

14. The method of claim 8, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

15. The method of claim 8, which is provided through a data network.

16. The method of claim 15, wherein the data network is an internet.

17. A gaming system server comprising:

at least one processor; and at least one memory device which stores a plurality of instructions, which when executed by the at least one processor, cause the at least one processor to:

(a) cause at least one display device to display a set of a plurality of symbol generators, wherein:

(i) each symbol generator includes at least one section associated with at least one symbol, (ii) each symbol generator is directly coupled to at least another one of the symbol generators such that two coupled symbol generators define an evaluation area, and (iii) at least one of the symbol generators is indirectly coupled to at least another one of the symbol generators such that each of the symbol generators of the set of symbol generators are coupled to each other, (b) activate one of the symbol generators of the set of symbol generators to start moving, wherein the activation of one of the symbol generators causes an activation of each of the coupled symbol generators of the set of symbol generators to start moving, (c) randomly deactivate one of the symbol generators of the set of symbol generators to stop moving, wherein the deactivation of one of the symbol generators causes a deactivation of each of the coupled symbol generators of the set of symbol generators to stop moving, (d) determine if any of the symbols associated with any of the sections stopped at the defined evaluation areas form any winning symbol combinations, and (e) if a plurality of the symbols of a plurality of the sections stopped at at least one of the defined evaluation areas form at least one winning symbol combination, cause the at least one display device to display one of a plurality of awards for each formed winning symbol combination, wherein a credit balance is increasable based on any displayed awards associated with each formed winning symbol combination, said credit balance being increasable via an acceptor of a physical item associated with a monetary value, and said credit balance being decreasable via a cashout device.

18. The gaming system server of claim 17, wherein when executed by the at least one processor, the plurality of instructions cause the at least one processor to display another set of another plurality of symbol generators, wherein each of the symbol generators of the other set of symbol generators are coupled to each other.

19. The gaming system server of claim 18, wherein when executed by the at least one processor if a symbol generator group connection event occurs, the plurality of instructions cause the at least one processor to merge both sets of symbol generators to form one merged set of symbol generators.

20. The gaming system server of claim 18, wherein when executed by the at least one processor, the plurality of instructions cause the at least one processor to enable a player to wager on a play of a game associated with each of the sets of symbol generators.

21. The gaming system server of claim 18, wherein when executed by the at least one processor, the plurality of instructions cause the at least one processor to enable a player to individually wager on a play of each of a plurality of games, each game being individually associated with one of the sets of symbol generators.

22. The gaming system server of claim 17, wherein different wager amounts are associated with different quantities of symbol generators in the set of symbol generators.

23. The gaming system server of claim 17, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

* * * * *